United States Patent
Thomas et al.

(10) Patent No.: US 7,480,655 B2
(45) Date of Patent: Jan. 20, 2009

(54) SYSTEM AND METHOD FOR PROTECTING FILES ON A COMPUTER FROM ACCESS BY UNAUTHORIZED APPLICATIONS

(75) Inventors: Steve Thomas, Boulder, CO (US); David Moll, Boulder, CO (US)

(73) Assignee: Webroor Software, Inc., Boulder, CO (US)

( * ) Notice: Subject to any disclaimer, the term of this patent is extended or adjusted under 35 U.S.C. 154(b) by 341 days.

(21) Appl. No.: 11/031,615

(22) Filed: Jan. 7, 2005

(65) Prior Publication Data
US 2005/0154738 A1 Jul. 14, 2005

Related U.S. Application Data

(60) Provisional application No. 60/535,213, filed on Jan. 9, 2004.

(51) Int. Cl.
*G06F 17/00* (2006.01)
*G06F 17/30* (2006.01)

(52) U.S. Cl. .......................... 707/9; 707/104.1
(58) Field of Classification Search .................. 707/2, 707/9, 104.1; 713/165, 167
See application file for complete search history.

(56) References Cited

U.S. PATENT DOCUMENTS

| | | | |
|---|---|---|---|
| 5,623,600 A | 4/1997 | Ji et al. | |
| 6,069,628 A | 5/2000 | Farry et al. | |
| 6,073,241 A | 6/2000 | Rosenberg et al. | |
| 6,092,194 A | 7/2000 | Touboul | |
| 6,154,844 A | 11/2000 | Touboul | |
| 6,167,520 A | 12/2000 | Touboul | |
| 6,310,630 B1 | 10/2001 | Kulkarni et al. | |
| 6,397,264 B1 | 5/2002 | Stasnick et al. | |
| 6,460,060 B1 | 10/2002 | Maddalozzo, Jr. et al. | |
| 6,480,962 B1 | 11/2002 | Touboul | |
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungck | |
| 6,965,968 B1 | 11/2005 | Touboul | |
| 7,058,822 B2 | 6/2006 | Edery et al. | |
| 2002/0162017 A1* | 10/2002 | Sorkin et al. | 713/201 |
| 2003/0159070 A1* | 8/2003 | Mayer et al. | 713/201 |

(Continued)

FOREIGN PATENT DOCUMENTS

WO PCT/US2006/041798 12/2007

OTHER PUBLICATIONS

PCT Search Report, PCT/US05/34874, Jul. 5, 2006, 7 Pages.

(Continued)

*Primary Examiner*—Uyen T. Le
(74) *Attorney, Agent, or Firm*—Cooley Godward Kronish LLP

(57) ABSTRACT

An application that generates a request to access a data file is identified. The application is determined to be not permitted to access the data file based on identified extension associated with that data file so as to quarantine and uninstall that application.

7 Claims, 5 Drawing Sheets

U.S. PATENT DOCUMENTS

| | | | |
|---|---|---|---|
| 2003/0217287 | A1 | 11/2003 | Kruglenko |
| 2004/0003290 | A1* | 1/2004 | Malcolm .................... 713/201 |
| 2004/0030914 | A1 | 2/2004 | Kelley et al. |
| 2004/0034794 | A1 | 2/2004 | Mayer et al. |
| 2004/0064736 | A1 | 4/2004 | Obrecht et al. |
| 2004/0080529 | A1 | 4/2004 | Wojcik |
| 2004/0143763 | A1 | 7/2004 | Radatti |
| 2004/0187023 | A1 | 9/2004 | Alagna et al. |
| 2004/0225877 | A1 | 11/2004 | Huang |
| 2005/0081053 | A1 | 4/2005 | Aston |
| 2005/0091658 | A1* | 4/2005 | Kavalam et al. ............ 718/104 |
| 2005/0138433 | A1 | 6/2005 | Linetsky |

OTHER PUBLICATIONS

Codeguru, Three Ways to Inject Your Code Into Another Process, by Robert Kuster, August 4, 2003, 19 pgs.

Codeguru, Managing Low-Level Keyboard Hooks With The Windows API for VB .Net, by Paul Kimmel, Apr. 18, 2004, 8 pgs.

Codeguru, Hooking The Keyboard, by Anoop Thomas, Dec. 13, 2001, 6 pgs.

Illusive Security, Wolves In Sheep's Clothing: malicious DLLs Injected Into trusted Host Applications, Author Unknown, http://home.arcor.de/scheinsicherheit/dll.htm 13 pgs.

DevX.com, Intercepting Systems API Calls, by Seung-Woo Kim, May 13, 2004, 4 pgs.

Microsoft.com, How To Subclass A Window in Windows 95, Article ID 125680, Jul. 13, 2004, 2 pgs.

MSDN, by Kyle Marsh, Jul. 29, 1993, 14 pgs.

Endrijonas Janet, Chapter 3 Microcom Virex for the PC Version 2.0, RxPC The Anti-Virus Handbook; 1993; pp. 25-43; 1st Ed.; TAB Books; Blue Ridge Summit, PA; 22 pgs.

* cited by examiner

SYSTEM AND METHOD FOR PROTECTING FILES ON A COMPUTER FROM ACCESS BY UNAUTHORIZED APPLICATIONS

PRIORITY

Priority is claimed to provisional application No. 60/535,213 filed on Jan. 9, 2004, entitled System and Method for Protecting Files on a Computer From Being Accessed by Unauthorized Applications, which is incorporated herein by reference.

FIELD OF THE INVENTION

The present invention relates to systems and methods for protecting computer files and/or data from being accessed by unauthorized applications, devices, or entities.

BACKGROUND

Personal computers and business computers are continually attacked by trojans, viruses, backdoors, exploits, and other harmful or unwanted programs. These programs can alter a user's computer files by adding or deleting data. And in other instances, these programs can read the data stored in a computer file and report it to a remote system. For example, a trojan could read a list of contacts stored in a file corresponding to MICROSOFT OUTLOOK and report those contacts to a spammer. Similarly, a trojan could read personal financial data from a MICROSOFT EXCEL file and report it to a remote computer.

Software and techniques, including antivirus products, anti-spyware and anti-malware products, exist to screen for malicious programs. Antivirus and anti-malware products generally create a definition library that includes definitions for known malicious programs. Unfortunately, antivirus and anti-malware products that rely on definition libraries are often vulnerable to new viruses, trojans, exploits, and malware products. Moreover, users that do not update their definition libraries frequently are vulnerable to known viruses, trojans, exploits, spyware and malware products.

With the increase in attacks on personal computers, cell phones, personal digital assistants, and the like, additional protection is needed to monitor the behavior of applications running or attempting to run on a computer system.

SUMMARY OF THE INVENTION

A method for limiting access to a data file is disclosed. One embodiment of the method receives a request from an application to access the data file; identifies the application that generated the request; identifies the extension associated with the data file; and based on the identified extension associated with the data file, determines that the application is not permitted to access the data file.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
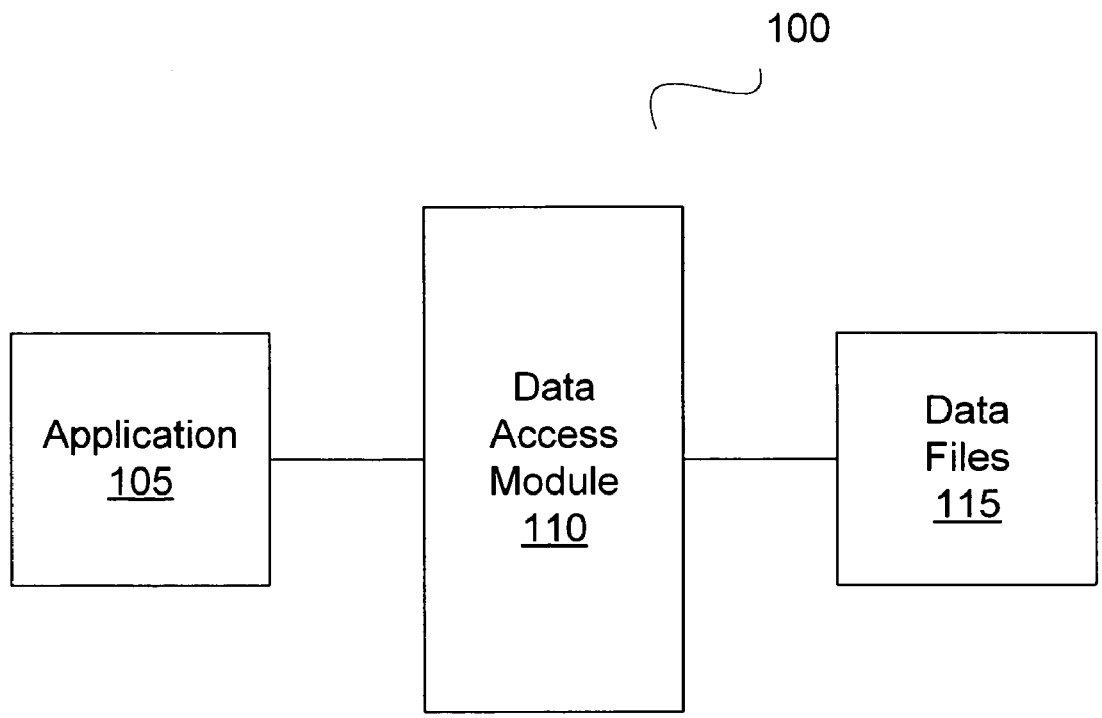
FIG. 1 is a block diagram of one embodiment of the present invention.

Referring now to FIG. 1, it illustrates a high-level block diagram of one embodiment 100 of the invention. This diagram includes three basic components: an application 105, a data access module 110, and data files 115. These three components can reside on a single computer system or can be distributed across multiple computer devices. For example, a typical system could include a personal computer with a WINDOWS, LINUX or other operating system. The application 105, which could include a consumer program such as MICROSOFT WORD, can resides on the personal computer. Similarly, the data access module 116 could also be located on the personal computer. And finally, the data files 115 could reside on the personal computer's hard drive or in memory. Notably, other embodiments of this system include distributed memory systems for storing the data files 115 and/or electronic systems such as personal digital assistants and/or cell phones instead of personal computers.

Regardless of the particular hardware used, the basic operation of this embodiment of the present invention allows the data access module 110 to deny the application 105 access to certain data files. The data access module 110 decides which files the application 105 can access based, for example, on the extension of the requested file and a list of permissions for the application or file type. For example, a MICROSOFT WORD application would have permission to access files with the extension ".doc." The data access module 110, however, could prevent other applications from accessing files with the ".doc" extension without authorization from the user. Thus, the data access module 110 creates a "file wall" that prevents certain application 105 from accessing certain files or certain file types.

By creating the "file wall," the data access module 110 serves as an extra level of protection beyond typical definition-based protection software. The data access module 110 provides protection against new viruses, trojans, etc. because it does not rely exclusively on definitions.

Figure 2:
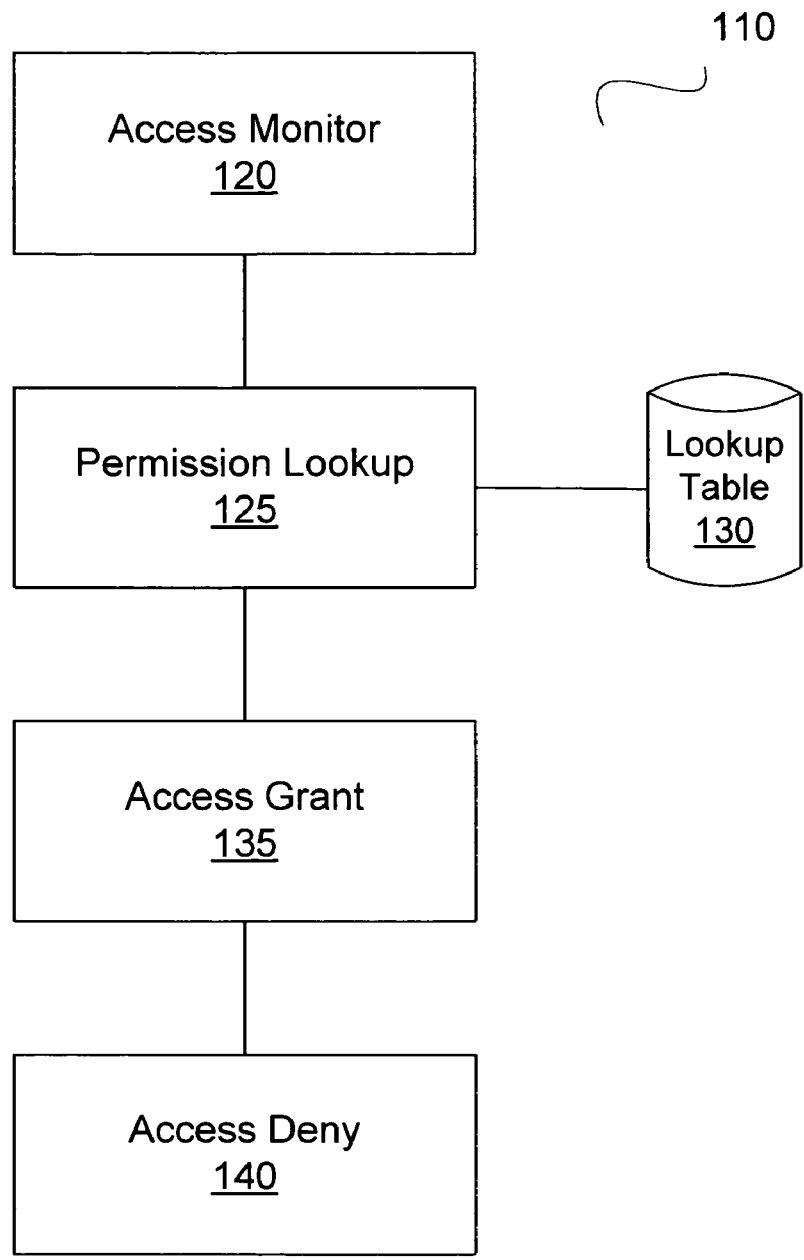
FIG. 2 is a block diagram of the data access module shown in FIG. 1.

Referring now to FIG. 2, it is a more detailed block diagram of the data access module 110 of FIG. 1. This embodiment of the data access module includes four modules: access monitor module 120, permission lookup module (connected with a lookup table 130), an access grant module 135, and an access deny module 140. These four modules together control access to data files 115 based on the application 105 requesting access to those data files.

The access monitor module 120 generally runs as a background process and is generally executed upon computer or device startup. The access monitor module 120 can be configured to detect a request for a data file and pass the information regarding that request on to the permission lookup module 125. For example, the module 120 can run as a background process and monitors file access requests (e.g., read/write/delete/modify/append) by applications running at any time.

In certain embodiments, the access monitor module 120 is configured to monitor for only certain types of requests. For example, the access monitor module 120 can be configured to monitor for requests related to certain file types or certain memory blocks. And any requests not falling in the file type or memory block range can be ignored by the "file wall" and handled according to the typical data retrieval method for that computer or device.

The permission lookup module 125 is generally responsible for determining whether the application 105 requesting a data file is permitted to access that data file. For example, the permission lookup module 125 could determine whether a downloaded game is permitted to access MICROSOFT WORD files. To make this type of determination, the permission lookup module 125 determines the identity of the application requesting access to the data file. Typically, the access monitor module 120 passes this information to the permission lookup module 125. The permission lookup module 125, however, could have the ability to determine the identity of the application on its own.

Once the permission lookup module 125 knows the type of application making the data request or its name, the permission lookup module 125 accesses the lookup table and determines which types of files the application is authorized to access. For example, the lookup table 130 could include a list of applications and file extensions corresponding to the type of files that each application can access. If an application is authorized to access the type of file corresponding to the request, then access is granted. And if the application is not authorized to access the type of file corresponding to the request, then access is denied.

In an alternate embodiment, the permission lookup module 125 indexes the lookup table 130 through the file extension corresponding to the requested data file. The lookup table 130 can then return a list of approved applications. The permission lookup module 125 can then compare the requesting application against the list of approved applications.

During installation (or through an options menu), the lookup table 130 portion of this permission lookup module 125 could, at the user's option, be automatically propagated based on default file extension matching. This means that the default applications that have been assigned associated file types in the operating system would be allowed permission in the database. For example, MS-WORD would automatically be allowed permission to access files that have a ".doc" file extension.

The access grant module 135 permits the data request to be executed in its normal fashion. The access deny module 135, however, blocks the requested file access. In certain embodiments, the access deny module 135 can ask the user whether the file access should be permitted. And if the user permits the access, a corresponding entry can be added to the lookup table 130. But if the user denies access, then the data request is blocked. In certain embodiments, an appropriate entry can be added to the lookup table 130 to indicate that the application does not have permission to access data files of the requested type.

When triggered, the access deny module 140 can take various actions to prevent the application from accessing the specific file. For example, it could take one or more of the following actions: locking the file by opening it; renaming the file; and/or sending an over-ride signal to the operating system to cancel the file access request.

Figure 3:
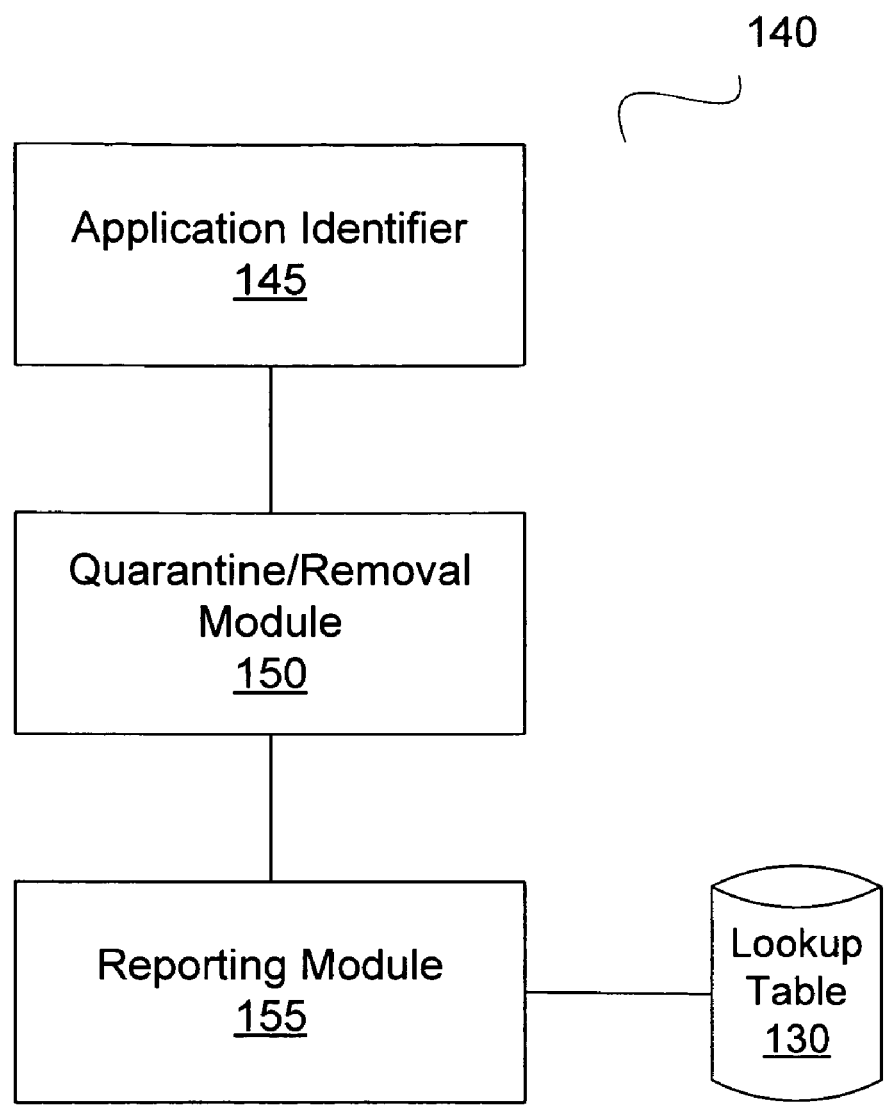
FIG. 3 is a block diagram of the access deny module shown in FIG. 2.

Referring now to FIG. 3, it is a block diagram of the access deny module 140 shown in FIG. 2. This embodiment of the access deny module 140 includes three modules: application identifier 145, quarantine/removal module 150, and the reporting module 155 (which communicates with the lookup table 130).

The first module, the application identifier module 145, is responsible for identifying the application that is requesting access to a data file. Identification can usually be done by extracting the application name from the data request. This information can be passed to the quarantine/removal module 150.

The quarantine/removal module 150 is responsible for quarantining and/or removing applications that improperly attempt to access data files. Assuming that a user indicates that the application attempting to access the data file does not have permission to do so the quarantine/removal module 150 can quarantine and remove the offending application. For example, the quarantine/removal module 150 could change the application name and move it to an alternate location. And if necessary, this module 150 could uninstall the program using, for example, the WINDOWS uninstall feature or a similar feature for another operating system.

In some cases, an application may attempt to improperly access a data file even though the application is otherwise wanted by the user. In these cases, the reporting module 155 can add an entry to the lookup table 130 to indicate that this application should never be given access to files of a certain type.

Figure 4:
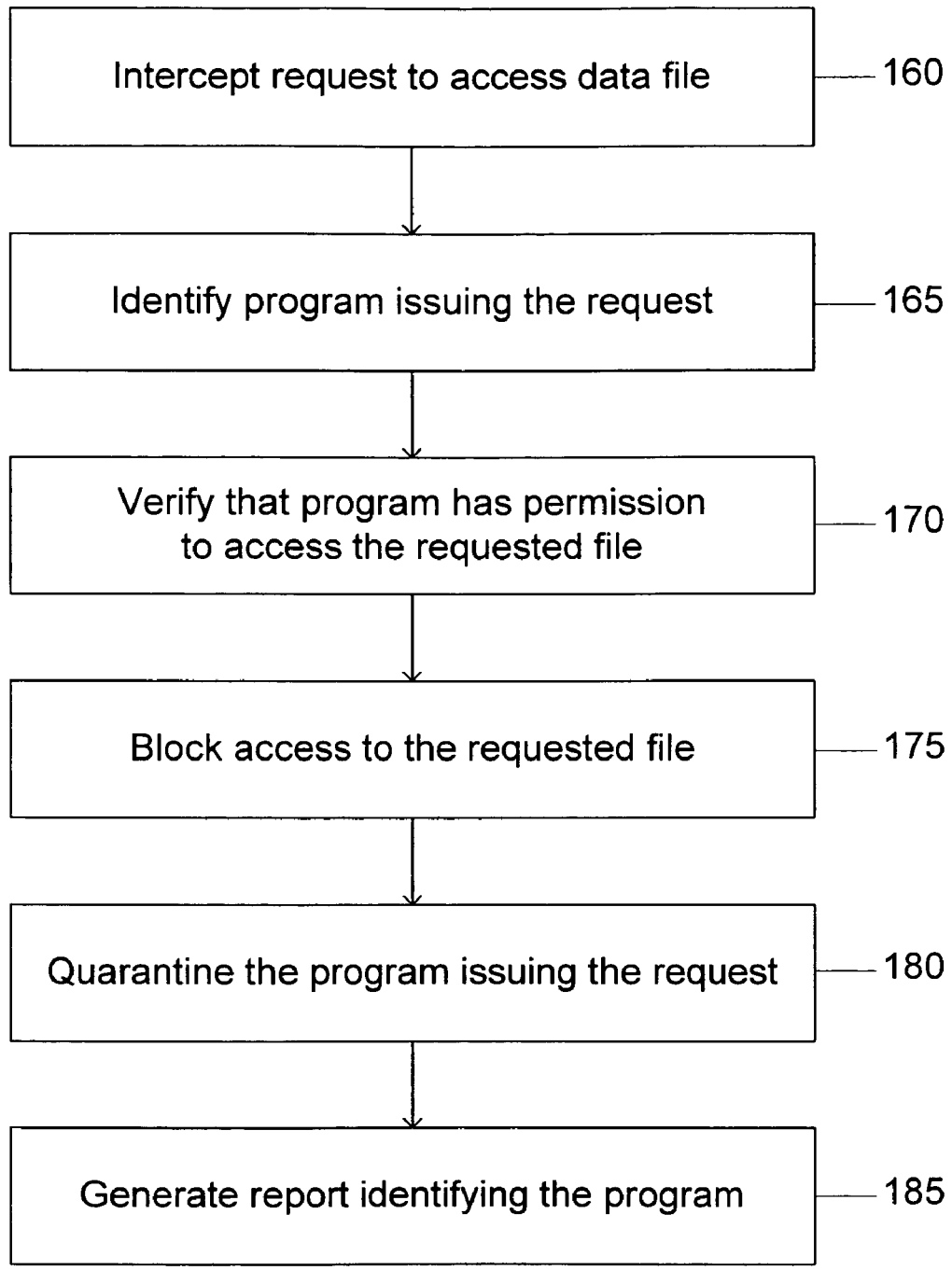
FIG. 4 is a flow chart of one method for blocking file access.

Referring now to FIG. 4, it is a flow chart of one method for blocking file access. In this method, an application requests access to a data file. The request is intercepted, and the requesting application is identified. (Blocks 160 and 165) Next, the identified application is compared with the data file type to determine whether the application has permission to access data files of this type. (Block 170) Assuming that the application has permission, the data request is passed through for traditional handling. And if the application does not have permission to access the data file or the type of data file, then the data access request is denied. (Block 175) In certain embodiments, the requesting application is then quarantined or removed. (Block 180) Information about the application can also be reported to a remote facility or a local database so that a definition can be created and passed to anti-spyware programs. (Block 185).

Figure 5:
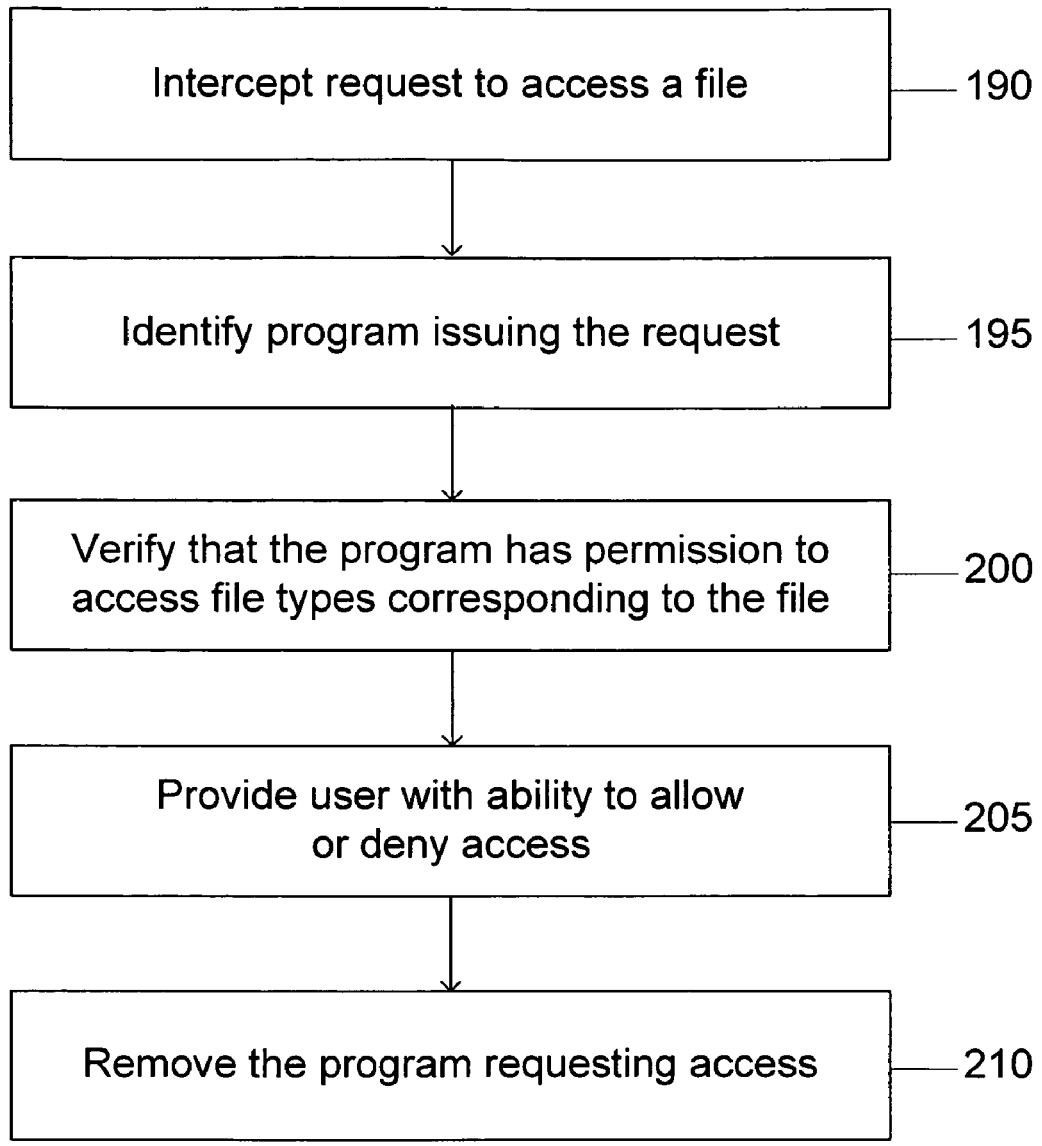
FIG. 5 is a flow chart of another method for blocking file access.

Referring now to FIG. 5, it is a flow chart of another method for blocking file access. In this method, a request to access a data file is intercepted, the requesting application identified, and the permission checked as in the previously described method. (Blocks 190, 195 and 200) In this method, however, the user is provided with the ability to manually allow or deny access. (Block 205) If the user allows access, then the data request is permitted. But if the user denies access, the requesting program can be quarantined and removed. (Block 210).

In conclusion, the present invention provides, among other things, a system and method for protecting electronic devices and stored data. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for limiting access to a data file, the method comprising:

receiving a request from an application to access the data file;

identifying the application that generated the request;

identifying the extension associated with the data file;

consulting stored information relating each of a plurality of file extensions and one or more applications authorized to access data files associated with that extension to determine, based on the identified extension associated with the data file, whether the identified application is permitted to access the data file;

denying the identified application access to the data file when it is determined that the identified application is not permitted to access the data file; and responsive to determining that the identified application is not permitted to access the data file, quarantining and uninstalling the identified application.

2. The method of claim 1, wherein the stored information is indexed by extension and determining whether the identified application is permitted to access the data file comprises:

identifying applications that are permitted to access data files including the identified extension.

3. The method of claim 1, wherein the stored information is indexed by application and determining whether the identified application is permitted to access the data file comprises:

identifying file extensions whose associated data files the identified application is permitted to access.

4. The method of claim 1, further comprising:

populating the stored information with default file extension matching data.

5. The method of claim 4, wherein populating the stored information with default file extension matching data comprises:

responsive to installing a new program, automatically populating the stored information with default file extension matching data.

6. A computer-implemented system for limiting access to a data file, the system comprising:

an access monitor module configured to:

detect a request from an application for a data file; and identify the application that generated the request;

a permission lookup module in communication with the access monitor module, the permission lookup module being configured to consult stored information relating each of a plurality of file extensions and one or more applications authorized to access data files associated with that extension to determine, based on the identified extension associated with the data file, whether the identified application is permitted to access the data file;

an access grant module in communication with the permission lookup module, the access grant module being configured to grant the identified application access to the data file when the permission lookup module has determined that the identified application is permitted to access the data file; and an access deny module in communication with the access grant module, the access deny module being configured to deny the identified application access to the data file when the permission lookup module has determined that the identified application is not permitted to access the data file;

wherein the access deny module is configured to quarantine and uninstall the identified application when the permission lookup module has determined that the identified application is not permitted to access the data file.

7. An article of manufacture for limiting access to a data file, the article of manufacture comprising:

a computer-readable storage medium; and a plurality of instructions on the computer-readable storage medium, the plurality of instructions configured, when executed on a processor, to:

process a received request from an application to access the data file;

identify the application that generated the request;

identify the extension associated with the data file;

consult stored information relating each of a plurality of file extensions and one or more applications authorized to access data files associated with that extension to determine, based on the identified extension associated with the data file, whether the identified application is permitted to access the data file;

deny the identified application access to the data file when it is determined that the identified application is not permitted to access the data file; and quarantine and uninstall the identified application when it is determined that the identified application is not permitted to access the data file.

* * * * *